G. C. TOUGH.
HARVESTER.
APPLICATION FILED JUNE 18, 1912.
1,127,829.
Patented Feb. 9, 1915.
2 SHEETS—SHEET 2.
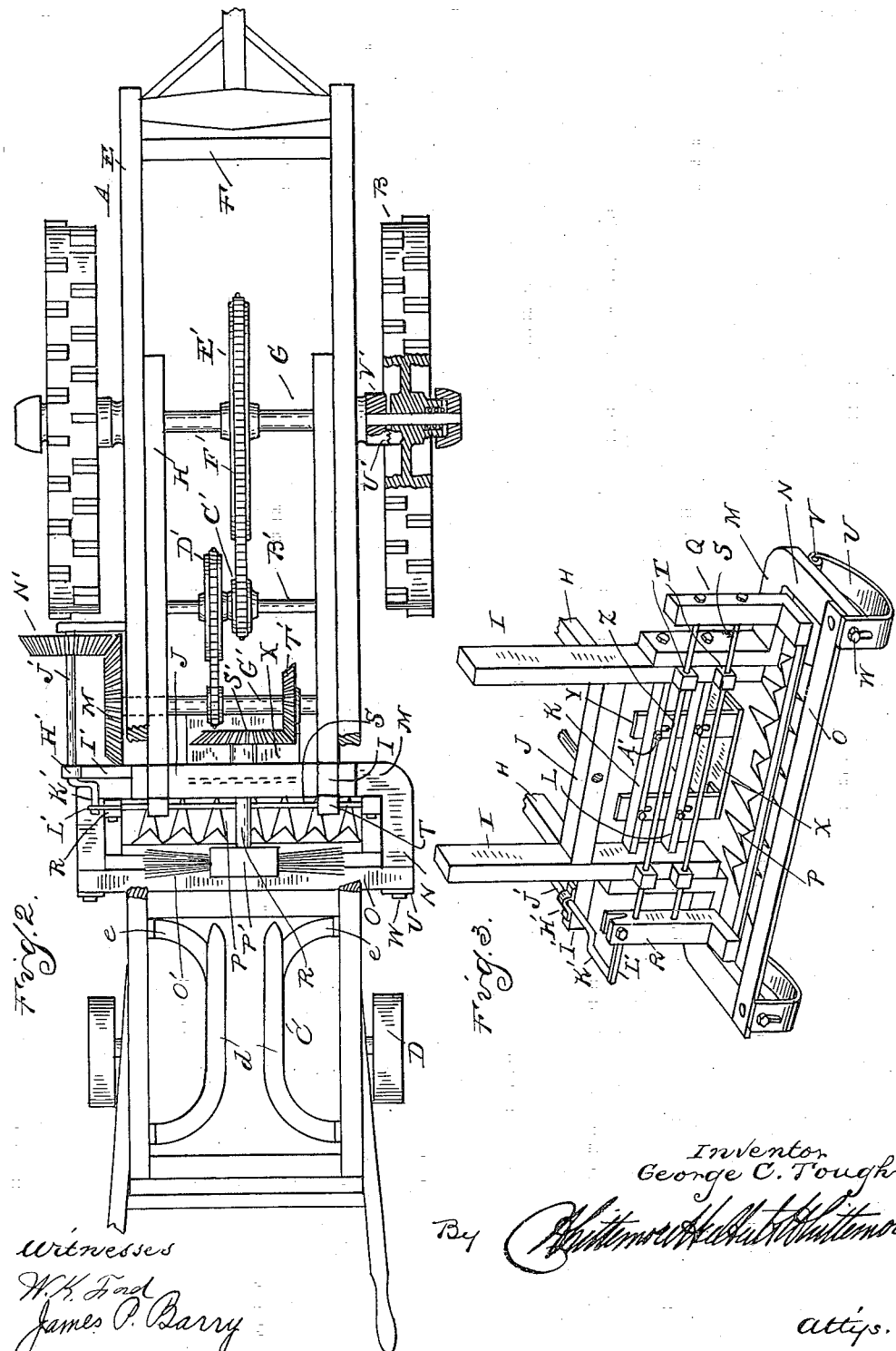
Witnesses
W. K. Ford
James P. Barry
Inventor
George C. Tough
By 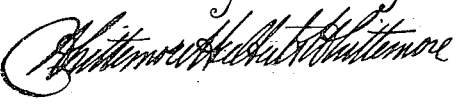
Attys.

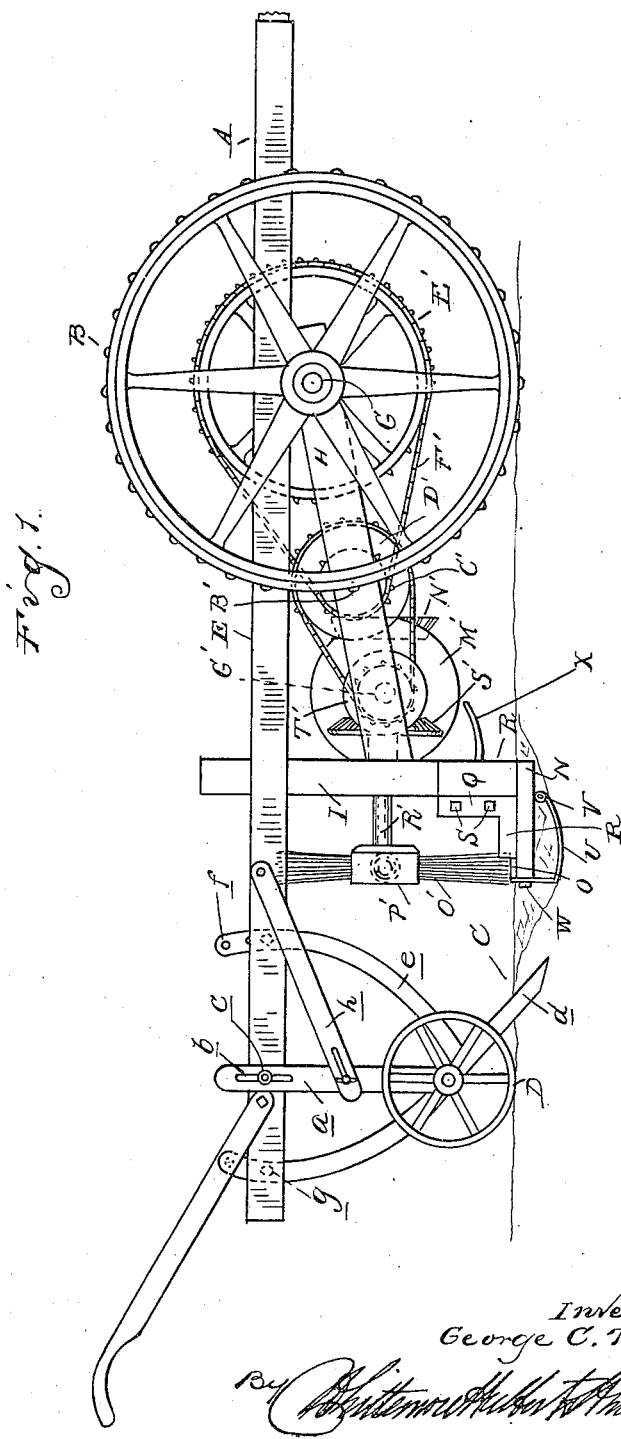

UNITED STATES PATENT OFFICE.

GEORGE C. TOUGH, OF MUNGER, MICHIGAN.

HARVESTER.

1,127,829.　　　Specification of Letters Patent.　　Patented Feb. 9, 1915.

Application filed June 18, 1912. Serial No. 704,316.

*To all whom it may concern:*

Be it known that I, GEORGE C. TOUGH, a citizen of the United States of America, residing at Munger, in the county of Bay and State of Michigan, have invented certain new and useful Improvements in Harvesters, of which the following is a specification, reference being had therein to the accompanying drawings.

The invention relates to harvesters and more particularly to a machine designed for harvesting vegetables such as beets or the like.

The invention has among the objects thereof to provide a cutter for topping beets or other vegetables; to provide means for preventing the cut tops from clogging the cutter knives; to provide a structure by which the cutter will be automatically, vertically adjusted, so as to uniformly top the vegetables; to provide means for adjusting the cutter relative to the ground so that the height at which the tops are cut, may be regulated, and further to combine with the topper a digger or plow whereby the vegetables may be topped and turned out of the ground by the same machine.

Other objects of the invention will more fully hereinafter appear.

The invention resides in the peculiar construction, arrangement and combination of parts, as more fully hereinafter described and particularly pointed out in the claims.

I will show and describe my invention as embodied in a beet harvester, but the invention may be readily applied to harvesters for other vegetables.

In the drawings:—Figure 1 is a side elevation of a beet harvester embodying my invention; Fig. 2 is a plan view thereof, partly in section, and Fig. 3 is a fragmentary perspective view of the topper with certain parts removed.

A designates the main frame of the machine, B the traction wheels therefor and C the digger or plow secured to the main frame and having suitable supporting wheels D. The frame A may be of any suitable construction but preferably comprises spaced side members E and cross connections F, the side members having suitable bearings (not shown) for the axle G of the traction wheels B.

The topping mechanism is carried by an auxiliary or sub-frame, herein shown as formed of side bars H having their forward ends pivoted upon the axle G and carrying at their opposite ends a vertically arranged section composed of spaced uprights I and cross bars J, K and L, the spaced uprights having upwardly projecting ends arranged between the side members E and serving to guide the sub-frame in its vertical movement. Secured to the outer side edges of the uprights are supports or brackets M which extend laterally outward and then terminate in rearward extensions N.

O is a cutter guard plate fixedly secured to the extensions N, and P is a knife or cutter of a type similar to a knife in a mowing machine, positioned upon the guard plate for travel thereover. Preferably the central tooth of the guard plate is cut away since I have found by so doing, better results are obtained. The knife is carried by a longitudinally reciprocating frame Q herein shown as composed of L-shaped members R connected together by one or more rods S arranged for longitudinal travel in bearings T upon the rear faces of the uprights I. Shoes U are secured to the extensions N for engaging the ground and supporting the rear end of the sub-frame and these shoes are made adjustable so that the distance of the knife from the ground may be varied, thereby permitting the height at which the beet tops are cut to be regulated. Thus the shoes U are each pivoted at the forward end, as at V, to the under face of the extension N and has its rear end extending upward and slotted to adjustably engage a set screw or bolt W upon the extension.

Quite frequently the body portions of some of the beets project a considerable distance above the ground and there would therefore be a tendency to cut into the beet body if the shoes U were adjusted to position the knife in close proximity to the ground. To avoid this a guard shoe X is positioned in advance of the cutter. This shoe is rigidly secured to the cross bars K and L by means of arms Y bolted to the cross bars, but the arms Y are provided with slotted portions Z for engaging the bolts A' so as to permit the guard shoe to be properly adjusted vertically. By this arrangement the shoe X will engage any beets which project out of the ground beyond a certain distance and ride thereover, causing the raising of the cutter sufficiently to insure the topping of the beet at the desired height.

The frame Q may be reciprocated from the axle G by any suitable drive mechanism, but in the drawings I have illustrated a novel and desirable drive train whereby the knife may be reciprocated at the desired speed. As shown B' is a countershaft carried by the side bars H and upon which is journaled a pinion C' and a gear D' fixed to rotate together.

E' is a large driving gear fixedly secured to the axle G, and F' a chain connecting the gear E' and pinion C'.

G' is a second shaft journaled in bearings in the members H and having one end thereof projecting beyond one of said side bars. Extending longitudinally of the sub-frame and journaled in bearings H', in members I' projecting laterally from one of the side bars of the sub-frame, is a counter shaft J' which has a crank K' connected by means of a pitman L' to one of the members R of the frame Q. M' N' are bevel gears respectively fixed to the projecting end of the shaft G' and to the member J'. As will be noticed, the several gears and pinions are so proportioned that the shaft J is driven from the axle G by a plurality of step up drive trains. This is exceedingly desirable since the rotation of the axle G is comparatively slow. Positioned over the cutter slightly in rear thereof is a rotary brush which serves to throw the beet tops after they are severed to one side of the cutter so as to avoid clogging of the latter. This brush is preferably formed of a plurality of sections O' of stiff wire, splints or the like that are carried by a head P' secured to a shaft R' which is journaled in the cross bar J. The shaft R' is driven from the member G' through the medium of bevel gears S' T'. In order that the topping mechanism will be driven only in the forward movement of the machine, the wheels B are connected to the axle G by means of a clutch U' composed of complementary ratchet teeth upon the wheel hub and a member V' fixed to the axle, the teeth being so arranged as to be automatically disengaged upon backwork rotation of the wheels B. The digger or plow is also secured to the main frame so as to be adjustable. Thus the wheels D are carried by standards a which are provided at their upper ends with slots b adjustably engaging bolts c on the side members of the main frame. This permits the raising or lowering of the rear end of the main frame. The plows or diggers comprise a pair of spaced members d having bifurcated portions e and each of the bifurcations has a plurality of openings f for engaging bolts g on the main frame, allowing the diggers to be raised or lowered independently of the wheels D, or the angle of either to be varied independent of the other. Preferably braces h are provided for the standards a.

In operation the machine is driven across the fields with the guard shoe X in the path of a row of beets. A forward movement of the machine reciprocates the knife through the medium of the several drive trains and also operates the rotary brush. The beets therefore are topped by the cutter, the tops thrown to one side by the brush and finally the beets turned out of the ground by the digger or plow. If the beet projects too great a distance above the ground, it will be engaged by the guard shoe and the cutter raised a sufficient distance to insure a proper cutting of the top.

What I claim as my invention is:—

1. In a harvester, the combination with a main frame, the traction wheels and the axle of said wheels, of a sub-frame, comprising spaced side bars pivotally engaging said axle, and a vertically extending section carried by said side bars, a cutter guard carried by said vertical section, a reciprocating frame also carried by said section, a cutter mounted upon said reciprocating frame and positioned in operative relation to said guard, and a drive connection between said axle and the reciprocating frame comprising a plurality of step-up drive trains.

2. In a harvester, the combination with a main frame, the traction wheels and the axle of said wheels, of a sub-frame, comprising spaced side bars pivotally engaging said axle, and a vertically extending section carried by said side bars, a cutter guard carried by said vertical section, a reciprocating frame also carried by said section, a cutter mounted upon said reciprocating frame and positioned in operative relation to said guard, a shaft secured to the side bars, a pinion on said shaft, a comparatively large gear on said axle, a connection between said pinion and said gear, a second gear on said shaft fixed to rotate with said pinion and of greater diameter than said pinion, a rotatable shaft journaled in said side bars and having one end projecting therebeyond, a pinion on said last-mentioned shaft having a drive connection with said last-mentioned gear, a counter shaft carried by said sub-frame having a crank, a pitman connecting said crank with said reciprocating frame, and a beveled gear between said counter shaft and said shaft projection.

3. In a harvester, the combination with a main frame and traction wheels, of a sub-frame, comprising a longitudinally extending section pivoted at one end to move relative to the main frame, and a vertically extending section carried by the other end of said longitudinally extending section, brackets upon said vertical section, a cutter guard carried by said brackets, ground engaging shoes upon said brackets, and a reciprocating frame also mounted upon said vertical frame, a cutter secured to said reciprocating frame and positioned in operative relation to said guard, and means for actuating said reciprocating frame.

4. In a harvester, the combination with a main frame and traction wheels, of a sub-frame, comprising a longitudinally extending section pivoted at one end to move relative to the main frame, and a vertically extending section carried by the other end of said longitudinally extending section, brackets upon said vertical section, a cutter guard carried by said brackets, ground engaging shoes upon said brackets, and a reciprocating frame also mounted upon said vertical frame, a cutter secured to said reciprocating frame and positioned in operative relation to said guard, a rotary brush journaled in said vertical frame and positioned over and slightly in rear of said cutter, and means for actuating said reciprocating frame and for driving said rotary brush.

5. In a harvester, the combination with a main frame, the traction wheels and the axle of said wheels, of a sub frame comprising spaced side bars pivotally engaging said axle, and a vertically extending section carried by the said side bars and having uprights passing between the sides of the main frame to guide the said vertically extending section in its upward movement, a cutter guard carried by the said vertical section, a reciprocating cutter carried by said vertical section, means for reciprocating said cutter, and a sweeper carried by said vertical section and adapted to keep the cutter bar free from tops.

6. In a harvester, the combination with a main frame, the traction wheels and axle of said wheels, of a sub-frame comprising spaced side bars engaging said axle, and a vertically extending section carried by said side bars, a cutter guard carried by said vertical section, cutting mechanism carried by said vertically extending section positioned in operative relation to said guard, and means for operating said cutting mechanism.

7. In a harvester, the combination with a main frame, the traction wheels and axle of said wheels, of a sub-frame comprising longitudinal bars for engaging the said axle, a vertically extending section carried by said bars, a reciprocating cutting mechanism carried by said vertical section, and means for reciprocating said cutting mechanism.

8. In a harvester, the combination with the main frame, the traction wheels and the axle of said wheels, of a sub-frame comprising spaced side bars pivotally engaging said axle, and a vertically extending section carried by said side bars, cutting mechanism carried by the said vertical section, operating means for the said cutting mechanism, and a sweeper positioned over the cutting mechanism and adapted to be revolved so as to keep the cutting mechanism free from tops.

9. In a harvester, the combination with a main frame, the traction wheels and the axle of said wheels, of a sub-frame comprising pivotally spaced side bars, and a vertically extending section carried by the said side bars and having uprights passing between the sides of the main frame, a cutter guard carried by said vertical section, a cutting frame also carried by said section, a cutter mounted on said frame, and positioned in operative relation to said guard, and means for operating said cutter.

In testimony whereof I affix my signature in presence of two witnesses.

GEORGE C. TOUGH.

Witnesses:
WILLIAM H. SMALL,
FRANK RICHARDSON.